United States Patent
Chen

(10) Patent No.: US 11,016,580 B1
(45) Date of Patent: May 25, 2021

(54) MOUSE

(71) Applicant: Chicony Electronics Co., Ltd., New Taipei (TW)

(72) Inventor: Ching-Chung Chen, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 16/902,285

(22) Filed: Jun. 16, 2020

(30) Foreign Application Priority Data

Feb. 26, 2020 (TW) .................................. 109106312

(51) Int. Cl.
  *G06F 3/0354* (2013.01)
  *G06F 3/03* (2006.01)
  *G06F 3/038* (2013.01)

(52) U.S. Cl.
  CPC ........ *G06F 3/03543* (2013.01); *G06F 3/0304* (2013.01); *G06F 3/0383* (2013.01)

(58) Field of Classification Search
  CPC ... G06F 3/03543; G06F 3/0383; G06F 3/0304
  See application file for complete search history.

(56) References Cited

U.S. PATENT DOCUMENTS

| | | | | |
|---|---|---|---|---|
| 7,217,912 | B2* | 5/2007 | Hwang | H04N 5/2251 250/208.1 |
| 10,226,697 | B2* | 3/2019 | Schmitz | A63F 13/24 |
| 10,310,633 | B2* | 6/2019 | Chang | G06F 3/03543 |
| 2013/0009874 | A1* | 1/2013 | Chun-Che | G06F 3/03543 345/166 |
| 2021/0051272 | A1* | 2/2021 | Liu | H04N 5/2257 |

* cited by examiner

*Primary Examiner* — Bryan Earles
(74) *Attorney, Agent, or Firm* — CKC & Partners Co., LLC

(57) ABSTRACT

A mouse includes an optical module and a casing. The optical module includes an optical element and two rotation portions. The optical element locates between the rotation portions. The casing includes a body, two extension portions, a driving piece and a rod. The extension portions connect to the body and define a space therebetween. The optical module locates at the space. The rotation portions insert into the extension portions. The driving piece moves inside the body and the extension portions. The driving piece is connected with one of the rotation portions and configured to rotate the corresponding rotation portion such that the optical element faces to a first direction or a second direction different from the first direction. A first end of the rod connects with the driving piece to move the driving piece. A second end of the rod is exposable outside the body.

13 Claims, 6 Drawing Sheets

MOUSE

RELATED APPLICATIONS

This application claims priority to Taiwanese Application Serial Number 109106312 filed Feb. 26, 2020, which is herein incorporated by reference.

BACKGROUND

Technical Field

The present disclosure relates to mice.

Description of Related Art

With the advancement of the technology, the application of computers has become an indispensable part of life. Apart from the general applications in daily lives, the computers are especially important in the commercial community. For example, the use of computer-operated screens for presentations of various projects has become a common activity for large and small companies.

During a presentation, if the speaker can make the listeners clearly concentrate on a particular part of the screen according to the instructions, the effect of the presentation will naturally be enhanced.

SUMMARY

A technical aspect of the present disclosure is to provide a mouse, which can allow the user to control the position of the cursor corresponding to the display screen of the electronic apparatus no matter the mouse abuts against the flat surface or leaves from the flat surface, leading to a larger convenience and a better flexibility to the user during operation.

According to an embodiment of the present disclosure, a mouse includes an optical module and a casing. The optical module includes an optical element and two rotation portions. The optical element is located between the rotation portions along an axis. The casing includes a main body, two extension portions, a driving piece and a supporting rod. The extension portions are respectively connected to the main body. The extension portions define an accommodation space therebetween. The optical module is at least partially located in the accommodation space. The rotation portions respectively at least partially insert into the extension portions. The driving piece is configured to move inside the main body and the extension portions. The driving piece is mechanically connected with one of the rotation portions. The driving piece is configured to rotate the corresponding rotation portion, such that the optical element faces to a first direction or a second direction. The second direction is different from the first direction. The supporting rod is configured to move relative to the main body along the first direction. The supporting rod has a first end and a second end. The first end and the second end are opposite to each other. The first end mechanically connects with the driving piece. The first end is configured to move the driving piece. The second end is configured to be exposable outside the main body.

In one or more embodiments of the present disclosure, the casing further includes a connection portion. The connection portion is connected between the first end and the driving piece.

In one or more embodiments of the present disclosure, the casing has a base plate. The base plate has a through hole. The supporting rod at least partially penetrates through the through hole along the first direction.

In one or more embodiments of the present disclosure, the driving piece is configured to move along a direction at least partially parallel with the base plate.

In one or more embodiments of the present disclosure, the direction is the same as the second direction.

In one or more embodiments of the present disclosure, the casing has a top plate. The top plate is opposite to the base plate. The driving piece is at least partially located and restricted between the top plate and the corresponding rotation portion.

In one or more embodiments of the present disclosure, the main body further includes a side plate. The side plate is connected with the base plate. The side plate is adjacent to the accommodation space. The casing further includes an elastic element. The elastic element is at least partially connected between the side plate and the driving piece.

In one or more embodiments of the present disclosure, an elastic force of the elastic element is less than a weight of the mouse and larger than a weight of the optical module.

In one or more embodiments of the present disclosure, at least one of the rotation portions has a plurality of first sawteeth. The first sawteeth are arranged around the axis. The driving piece has a plurality of second sawteeth. The second sawteeth are disposed on a side of the driving piece facing to the corresponding rotation portion. The second sawteeth are configured to couple with the first sawteeth.

In one or more embodiments of the present disclosure, the optical element is an optical motion tracking chip. The optical motion tracking chip is configured to calculate a moving distance according to an image.

In one or more embodiments of the present disclosure, the casing further includes a processor, a signal transmitter and at least one connecting cable. The processor is disposed inside the main body. The processor is configured to convert the moving distance to a first data. The signal transmitter is electrically connected with the processor. The signal transmitter is configured to transmit a first signal to an electronic apparatus according to the first data. The connecting cable is electrically connected to the processor and the optical element. The connecting cable at least partially penetrates through one of the rotation portions.

In one or more embodiments of the present disclosure, the casing further includes a sensor. The sensor is located inside the main body. The sensor is configured to sense whether the optical element faces to the first direction or the second direction and provide a second data. The sensor is electrically connected to the signal transmitter. The signal transmitter is configured to transmit a second signal to the electronic apparatus according to the second data.

In one or more embodiments of the present disclosure, the second direction is substantially perpendicular to the first direction.

The above-mentioned embodiments of the present disclosure have at least the following advantages:

(1) No matter the mouse abuts against the flat surface or leaves from the flat surface, the user can control the position of the cursor corresponding to the display screen of the electronic apparatus, which is largely convenient and flexible to the user during operation.

(2) The user is allowed to gesture with the mouse in the air to directly control the position of the cursor on the picture as projected, which is largely convenient to the user.

(3) Through the reduction in length upon compression or elastic recovery of the elastic element, when the mouse abuts against the flat surface or leaves from the flat surface, the facing direction of the optical element can automatically switch between the first direction and the second direction. The process is simple and fast.

(4) Since the sensor can sense and thus judge whether the optical element faces to the first direction or the second direction, the electronic apparatus can calculate the magnitude and direction of the corresponding movement of the cursor on the display screen more accurately with respect to magnitude of movement obtained from the image.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
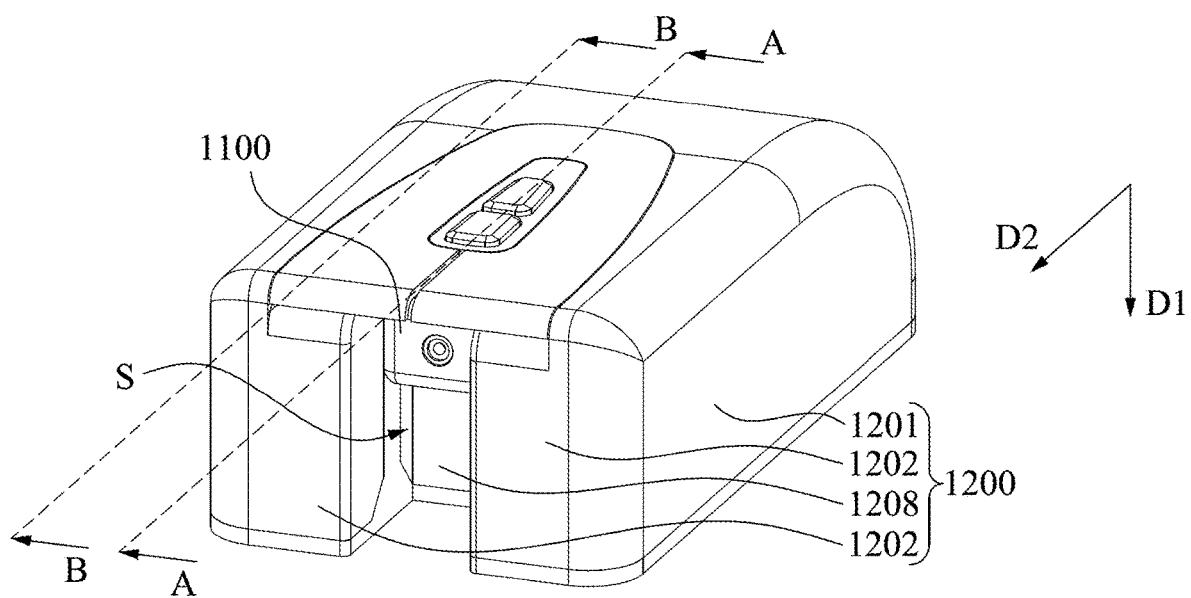
FIG. 1 is a three-dimensional top view of a mouse according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
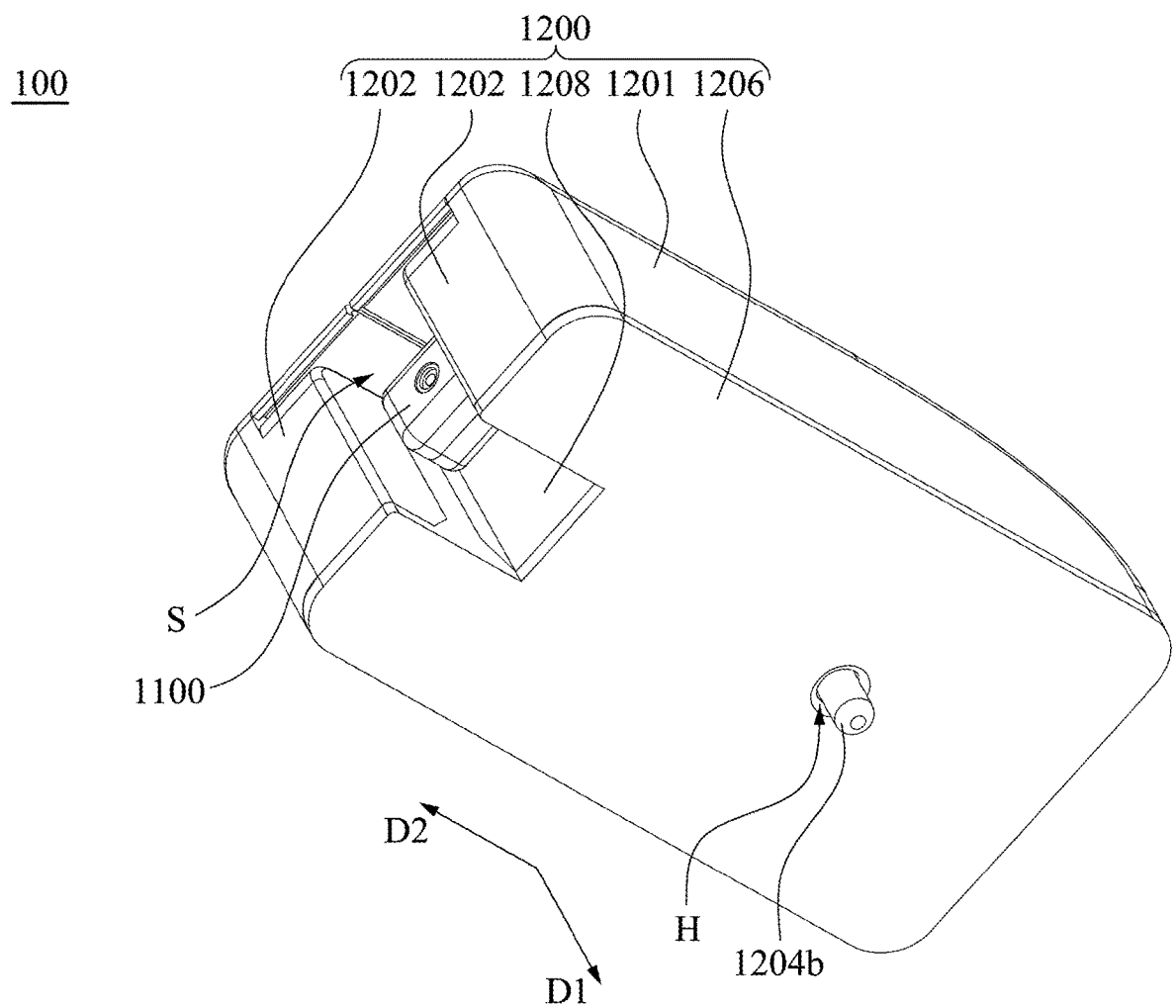
FIG. 2 is a three-dimensional bottom view of the mouse of FIG. 1.
Figure 3:
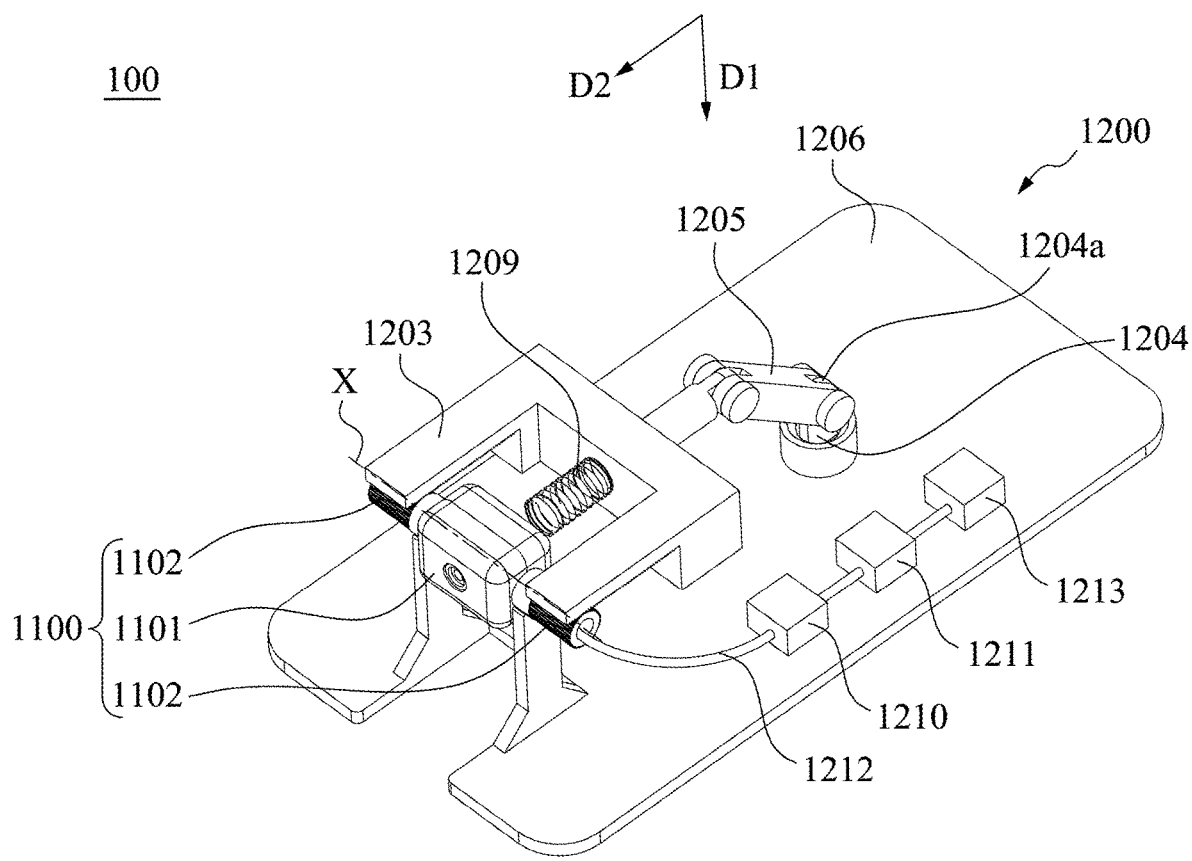
FIG. 3 is a schematic view of an internal structure of the mouse of FIG. 1.

Reference is made to FIGS. 1-3. FIG. 1 is a three-dimensional top view of a mouse 100 according to an embodiment of the present disclosure. FIG. 2 is a three-dimensional bottom view of the mouse 100 of FIG. 1. FIG. 3 is a schematic view of an internal structure of the mouse 100 of FIG. 1. In this embodiment, as shown in FIGS. 1-3, a mouse 100 includes an optical module 1100 and a casing 1200. The optical module 1100 includes an optical element 1101 and two rotation portions 1102. The optical element 1101 is located between the rotation portions 1102 along an axis X. The casing 1200 includes a main body 1201, two extension portions 1202, a driving piece 1203 and a supporting rod 1204. The extension portions 1202 are respectively connected to the main body 1201. The extension portions 1202 define an accommodation space S therebetween. The optical module 1100 is at least partially located in the accommodation space S. The rotation portions 1102 of the optical module 1100 respectively at least partially insert into the extension portions 1202 of the casing 1200. In this embodiment, for example, the accommodation space S is located outside the main body 1201. However, this does not intend to limit the present disclosure. The driving piece 1203 is configured to move inside the main body 1201 and the extension portions 1202. The driving piece 1203 is mechanically connected with one of the rotation portions 1203. The driving piece 1203 is configured to rotate the corresponding rotation portion 1102 about the axis X, such that the optical module 1100 is able to rotate relative to the casing 1200 about the axis X and the optical element 1101 is able to face to a first direction D1 or a second direction D2. The second direction D2 is different from the first direction D1. In this embodiment, for example, the second direction D2 is substantially perpendicular to the first direction D1. However, this does not intend to limit the present disclosure. The supporting rod 1204 is configured to move relative to the main body 1201 along the first direction D1. The supporting rod 1204 has a first end 1204a and a second end 1204b. The first end 1204a and the second end 1204b are opposite to each other. The first end 1204a of the supporting rod 1204 mechanically connects with the driving piece 1203. The first end 1204a of the supporting rod 1204 is configured to move the driving piece 1203. The second end 1204b of the supporting rod 1204 is configured to be exposable outside the main body 1201.

Figure 4:
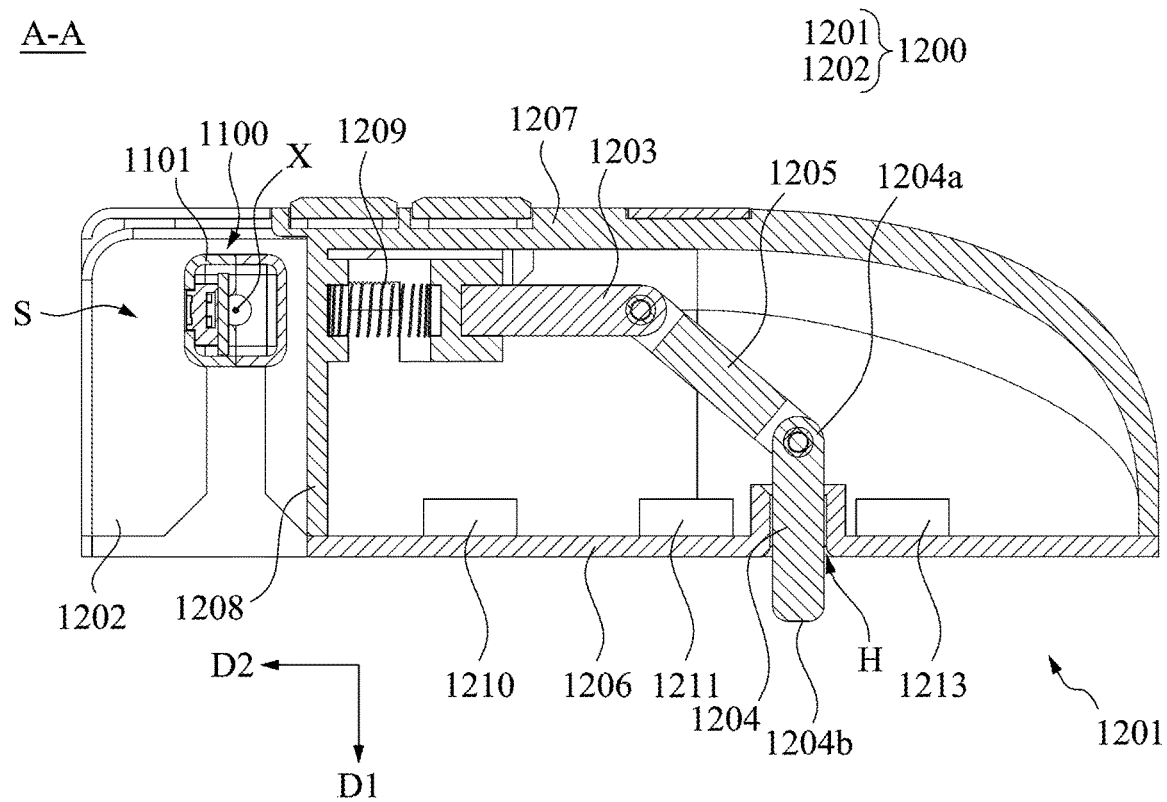
FIG. 4 is a cross-sectional view along the section line A-A of FIG. 1, in which the optical element faces to the second direction.

Reference is made to FIG. 4. FIG. 4 is a cross-sectional view along the section line A-A of FIG. 1, in which the optical element 1101 faces to the second direction D2. As shown in FIGS. 2-4, the casing 1200 has a base plate 1206. The base plate 1206 has a through hole H. The supporting rod 1204 at least partially penetrates through the through hole H of the base plate 1206 along the first direction D1, in which the first direction D1 can be a normal direction of the base plate 1206. However, this does not intend to limit the present disclosure. In addition, the casing 1200 further includes a connection portion 1205. As shown in FIGS. 3-4, the connection portion 1205 is connected between the first end 1204a of the supporting rod 1204 and the driving piece 1203. In this embodiment, the driving piece 1203 is configured to move along a direction at least partially parallel with the base plate 1206. In this embodiment, the second direction D2 is parallel with the base plate 1206 (and perpendicular to the first direction D1). In other words, the direction parallel with the base plate 1206 is the same as the second direction D2. Thus, the driving piece 1203 is configured to move at least partially along the second direction D2. In other embodiments, the second direction D2 can be not parallel with the base plate 1206.

Furthermore, as shown in FIGS. 1, 2, and 4, the main body 1201 further includes a side plate 1208. The side plate 1208 is connected with the base plate 1206. The side plate 1208 is adjacent to the accommodation space S. In this embodiment, the casing 1200 further includes an elastic element 1209. The elastic element 1209 is at least partially connected between the side plate 1208 of the main body 1201 and the driving piece 1203. To simplify the figures, the side plate 1208 is not shown in FIG. 3.

In practical applications, when the elastic element 1209 is in the status of recovery without storing any elastic potential energy, the second end 1204*b* of the supporting rod 1204 is at least partially exposed outside the main body 1201. At this point, as shown in FIG. 4, the optical element 1101 of the optical module 1100 faces to the second direction D2.

Figure 5:
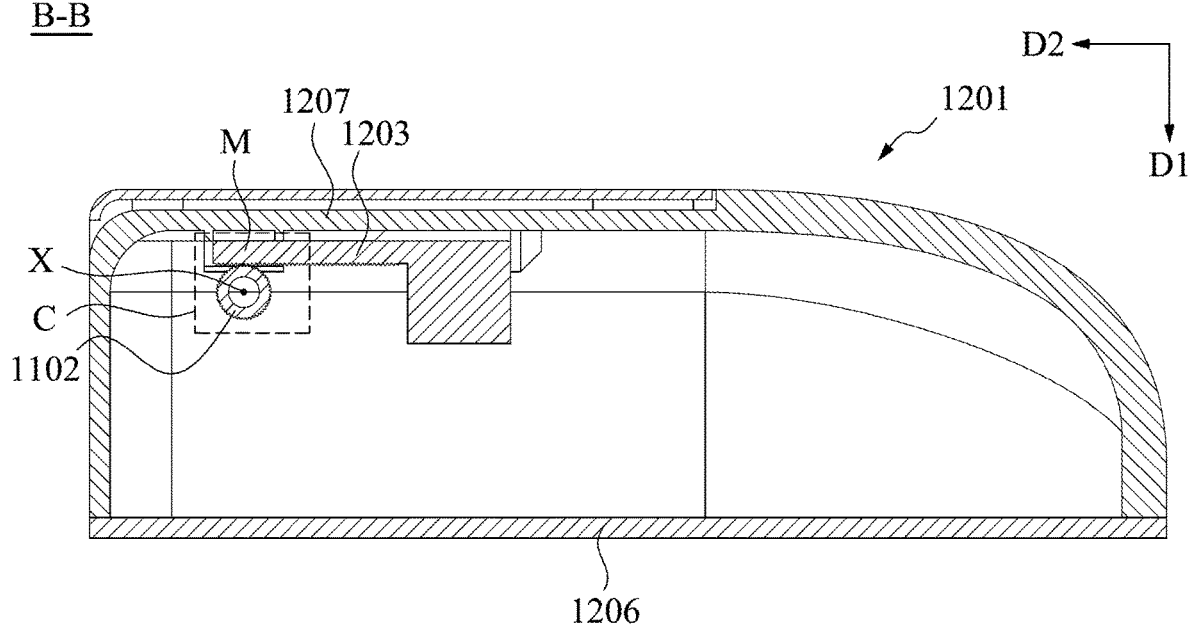
FIG. 5 is a cross-sectional view along the section line B-B of FIG. 1, in which the rotation portion is rotated by the driving piece such that the optical element faces to the second direction as shown in FIG. 4.

Reference is made to FIG. 5. FIG. 5 is a cross-sectional view along the section line B-B of FIG. 1, in which the rotation portion 1102 is rotated by the driving piece 1203 such that the optical element 1101 faces to the second direction D2 as shown in FIG. 4. Please refer to FIGS. 4-5 at the same time. In this embodiment, as shown in FIG. 4, when the optical element 1101 faces to the second direction D2, the elastic element 1209 does not store any elastic potential energy and is in the status of recovery. As shown in FIG. 5, in the condition that the elastic element 1209 does not store any elastic potential energy and is in the status of recovery, the rotation portion 1102 is mechanically connected with a first contact point M of the driving piece 1203.

Figure 6:
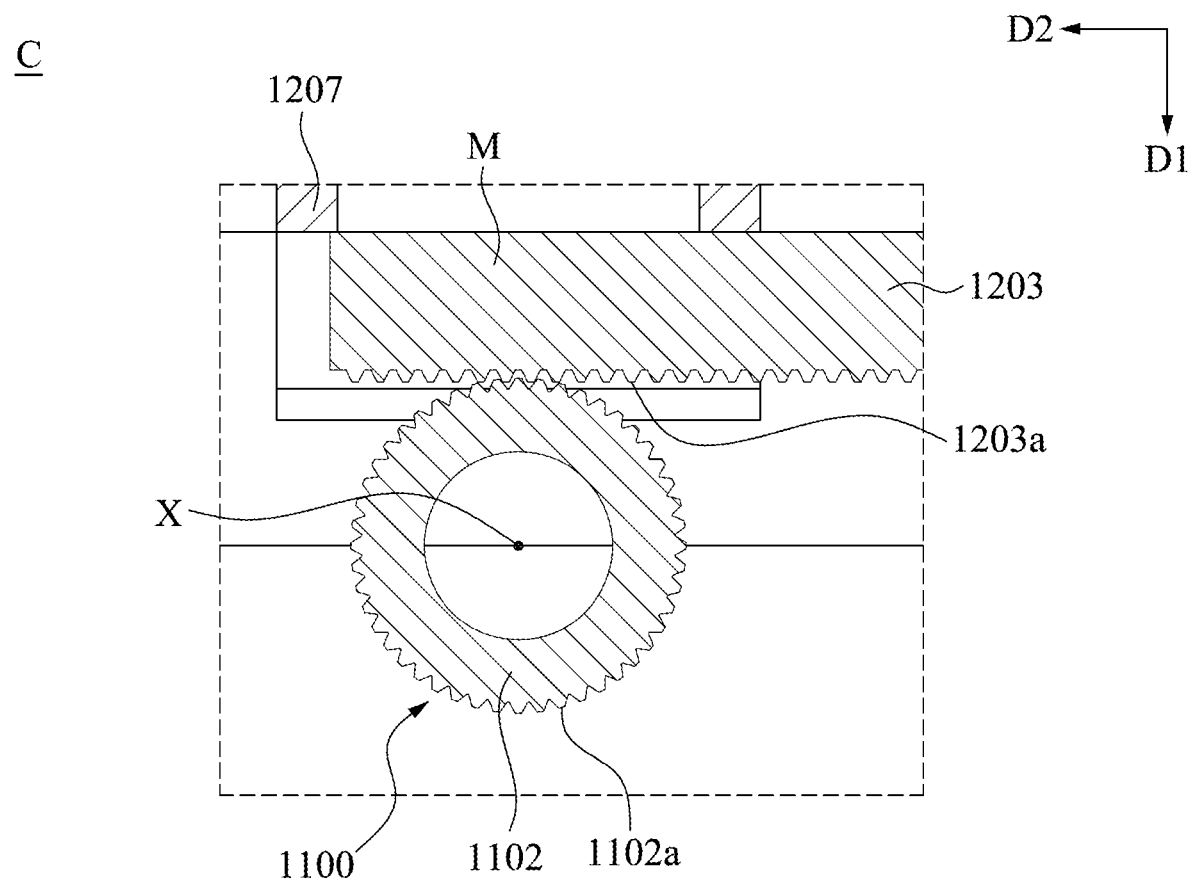
FIG. 6 is a partially enlarged view of the region C in FIG. 5.

Reference is made to FIG. 6. FIG. 6 is a partially enlarged view of the region C in FIG. 5. In this embodiment, as shown in FIG. 6, at least one of the rotation portions 1102 of the optical module 1100 has a shape of sawteeth. To be specific, at least one of the rotation portions 1102 has a plurality of first sawteeth 1102*a*. The first sawteeth 1102*a* are arranged around the axis X. Correspondingly, the driving piece 1203 has a plurality of second sawteeth 1203*a*. The second sawteeth 1203*a* are disposed on a side of the driving piece 1203 facing to the corresponding rotation portion 1102. The second sawteeth 1203*a* are configured to couple with the first sawteeth 1102*a*. When the driving piece 1203 moves along the direction parallel with the base plate 1206 relative to the rotation portion 1102 having the first sawteeth 1102*a*, the second sawteeth 1203*a* of the driving piece 1203 drives the rotation portion 1102 to rotate about the axis X through the coupling with the first sawteeth 1102*a*. To be more specific, as shown in FIG. 6, the second sawteeth 1203*a* disposed at the first contact point M couple with the first sawteeth 1102 of the rotation portion 1102. In addition, the user can control the scope of rotation of the optical element 1101 through the coupling relation between the first sawteeth 1102*a* and the second sawteeth 1203*a*. In other embodiments, the second direction D2 can be not perpendicular to the first direction D1, and an included angle between the second direction D2 and the first direction D1 can be 60 degree, 45 degree or other degrees according to the actual application. However, this does not intend to limit the present disclosure.

Moreover, as shown in FIGS. 4-6, the casing 1200 has a top plate 1207. The top plate 1207 is opposite to the base plate 1206. The top plate 1207 is at least partially of a streamlined shape, facilitating the user to put his palm on top of the mouse 100 for controlling. The driving piece 1203 is at least partially located and restricted between the top plate 1207 and the corresponding rotation portion 1102 of the optical module 1100. In this way, the driving piece 1203 is restricted in position between the top plate 1207 and the corresponding rotation portion 1102, facilitating the driving piece 1203 to move along the direction at least partially parallel with the base plate 1206.

Figure 7:
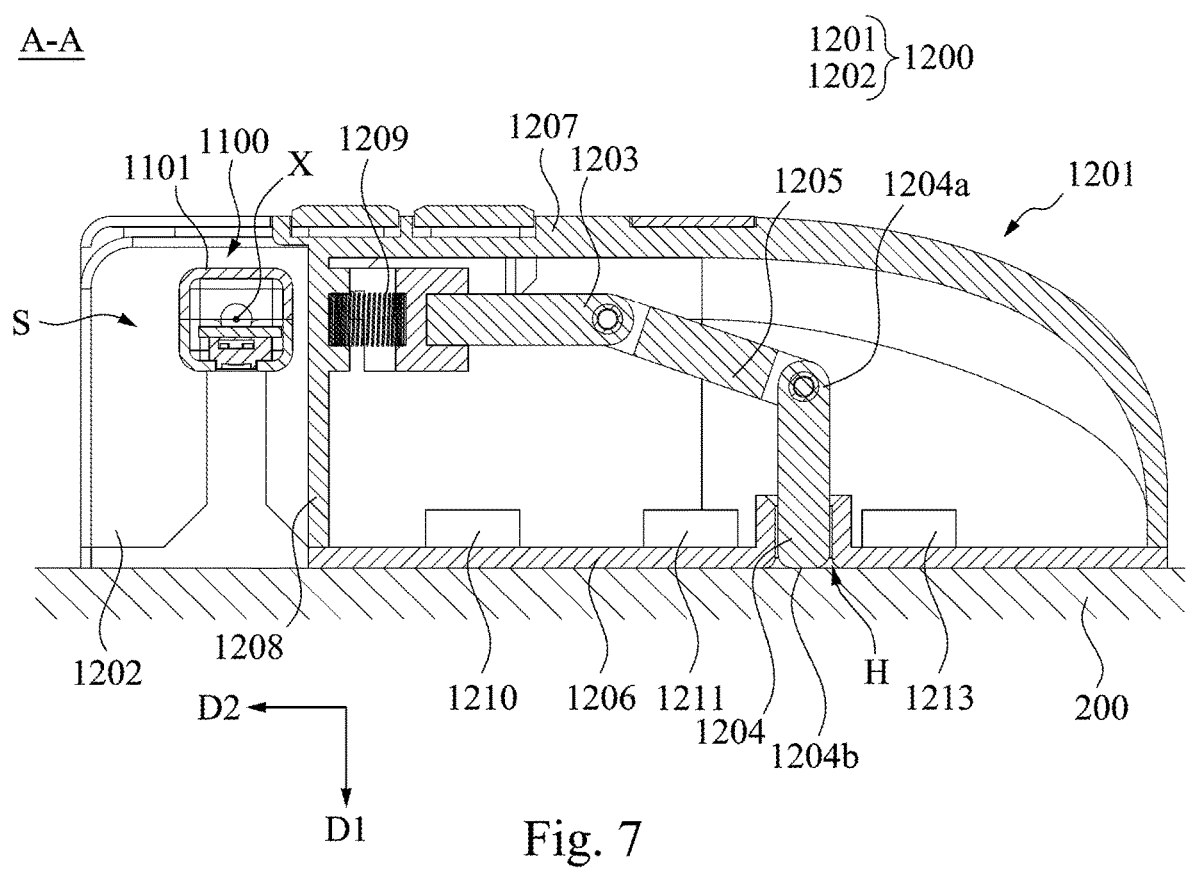
FIG. 7 is a cross-sectional view along the section line A-A of FIG. 1, in which the optical element faces to the first direction.
Figure 8:
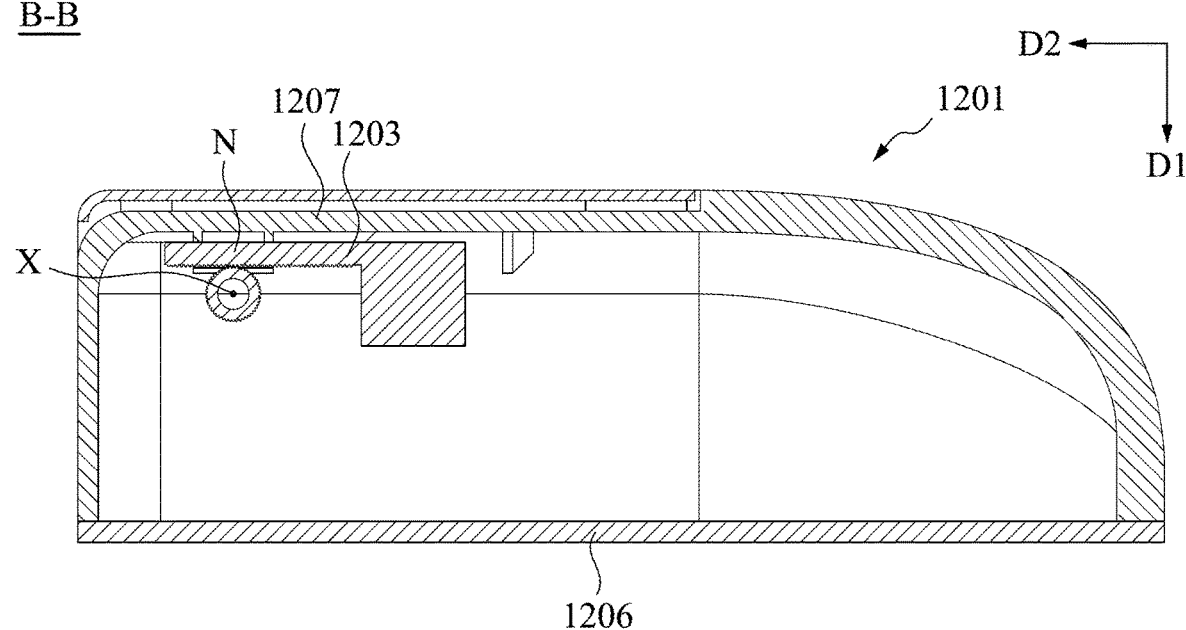
FIG. 8 is a cross-sectional view along the section line B-B of FIG. 1, in which the rotation portion is rotated by the driving piece such that the optical element faces to the first direction as shown in FIG. 7.

Reference is made to FIGS. 7-8. FIG. 7 is a cross-sectional view along the section line A-A of FIG. 1, in which the optical element 1101 faces to the first direction D1. FIG. 8 is a cross-sectional view along the section line B-B of FIG. 1, in which the rotation portion 1102 is rotated by the driving piece 1203 such that the optical element 1101 faces to the first direction D1 as shown in FIG. 7. In this embodiment, as shown in FIGS. 7-8, when the second end 1204*b* of the supporting rod 1204 is compressed from the outside, the supporting rod 1204 moves towards the inside of the main body 1201 through the through hole H of the base plate 1206 through the first direction D1, until the supporting rod 1204 enters completely inside the main body 1201. The movement of the supporting rod 1204 drives the movement of the connection portion 1205, and the connection portion 1205 also drives the driving piece 1203 to move along the direction at least partially parallel with the base plate 1206, such that the distance between the driving piece 1203 and the side plate 1208 at least partially decreases. The elastic element 1209 connected between the side plate 1208 of the main body 1201 and the driving piece 1203 is then compressed to store a certain amount of elastic potential energy. As shown in FIG. 8, in the condition after the driving piece 1203 is driven and the elastic element 1209 is compressed to store a certain amount of elastic potential energy, the driving piece 1203 moves relative to the rotation portion 1102 along the direction at least partially parallel with the base plate 1206, such that the rotation portion 1102 is mechanically connected with a second contact point N of the driving piece 1203. Moreover, the optical module 1100 rotates with the rotation portion 1102 relative to the driving piece 1203, such that the optical element 1101 faces to the first direction D1. It is worth to note that, in this embodiment, through the adjustment of the dimensions of the supporting rod 1204 and the connection portion 1205, the stroke of the movement of the supporting rod 1204 can be equal to the stroke of the elastic element 1209 to be compressed, which is also equal to the stroke of the movement of the driving piece 1203. Therefore, when the supporting rod 1204 enters completely into the main body 1201, the elastic element 1209 reaches the shortest length, and the driving piece 1203 moves to the farthest reachable position. When the driving piece 1203 moves to the farthest reachable position, the optical element 1101 exactly faces to the first direction D1.

When the second end 1204*b* of the supporting rod 1204 is no longer compressed from the outside, the elastic element 1209 is not compressed anymore and releases the certain amount of the elastic potential energy stored when being compressed. The elastic element 1209 then drives the driving piece 1203, such that the rotation portion 1102 rotates and changes to mechanically connect with the first contact point M of the driving piece 1203 from the second contact point N of the driving piece 1203. Then, the optical module 1100 rotates with the rotation portion 1102 relative to the driving piece 1203, to make the optical element 1101 to face to the second direction D2 from the first direction D1, and the supporting rod 1204 is at least partially exposed outside the main body 1201.

In simple words, when the second end 1204*b* of the supporting rod 1204 is not compressed and is at least partially exposed outside the main body 1201, the optical element 1101 of the optical module 1100 faces to the second direction D2. On the other hand, when the supporting rod 1204 is compressed from the outside and enters into the main body 1201, the optical element 1101 of the optical module 1100 faces to the first direction D1.

In practical applications, an elastic force of the elastic element 1209 is less than a weight of the mouse 100 and larger than a weight of the optical module 1100. Therefore, the supporting rod 1204 will not be prevented from entering into the main body 1201 because the elastic element 1209 is difficult to be compressed. On the contrary, the elastic element 1209 will not be too weak to drive the driving piece 1203 to rotate the rotation portion 1102 when recovery after compression.

In this embodiment, the optical element 1101 of the optical module 1100 is an optical motion tracking chip. The optical motion tracking chip is configured to take an image and calculate a moving distance according to the image. To be specific, when the optical element 1101 faces to the first direction D1, the shooting lens of the optical element 1101 faces to the first direction D1. The optical motion tracking chip calculates a moving distance according to the image taken in the first direction D1. When the optical element 1101 faces to the second direction D2, the shooting lens of the optical element 1101 faces to the second direction D2. The optical motion tracking chip calculates a moving distance according to the image taken in the second direction D2.

In addition, as shown in FIGS. 3, 4, and 7, the casing 1200 further includes a processor 1210, a signal transmitter 1211 and at least one connecting cable 1212. The processor 1210 is disposed inside the main body 1201. The processor 1210 is configured to convert the moving distance calculated from the images taken by the optical element 1101 to a first data. The signal transmitter 1211 is electrically connected with the processor 1210. The signal transmitter 1211 is configured to transmit a first signal to an electronic apparatus (not shown) electrically connected with or having a matching relation with the mouse 100 according to the first data. The connecting cable 1212 is electrically connected to the processor 1210 and the optical element 1101 of the optical module 1100. The connecting cable 1213 at least partially penetrates through one of the rotation portions 1102.

When using the mouse 100, the user connects the mouse 100 to an electronic apparatus having a display screen. The way of connection can be through a wire or wireless. When the user moves the mouse 100, the cursor on the display screen moves correspondingly according to the magnitude and direction of the movement of the mouse 100. Therefore, the user can control the position of the cursor on the display screen through controlling the mouse 100.

When the user abuts the base plate 1206 of the mouse 100 against a flat surface 200 (please refer to FIG. 7), the mouse 100 is in the status as shown in FIGS. 7-8 as mentioned above, and the optical element 1101 faces to the first direction D1. That means the optical element 1101 faces to the flat surface 200 and takes the image of the flat surface 200. When the user moves the mouse 100 while keeping the base plate 1206 of the mouse 100 abutting against the flat surface 200, the image to be taken by the optical element 1101 changes with the movement of the mouse 100. In other words, the first data converted by the processor 1210 from the moving distance calculated from the image changes as well, and the first signal transmitted to the electronic apparatus by the signal transmitter 1211 according to the first data also changes correspondingly. Through the first signal changed, i.e., the changes of the distance and direction of the image of the flat surface 200 taken by the optical element 1101, the electronic apparatus calculates the corresponding magnitude and direction of movement of the cursor on the display screen. In this way, the user can change the position of the cursor on the display screen through moving the mouse 100. For example, the flat surface 200 can be a mouse pad or a top surface of a desk. However, this does not intend to limit the present disclosure.

When the user picks up the mouse 100 such that the mouse 100 is in the air and the base plate 1206 of the mouse 100 does not abut against the flat surface 200 anymore, the mouse 100 is in the status as shown in FIGS. 4-5 as mentioned above, and the optical element 1101 faces to the second direction D2. In practical applications, the second direction D2 can be any random direction. For example, the second direction D2 can be a direction towards which a picture is projected by the electronic apparatus, a direction of the ceiling, or a direction towards the flat surface 200. When the user moves the mouse 100 while keeping the mouse 100 in the air, the image to be taken by the optical element 1101 changes with the movement of the mouse 100. In other words, the first data converted by the processor 1210 from the moving distance calculated from the image changes as well, and the first signal transmitted to the electronic apparatus by the signal transmitter 1211 according to the first data also changes correspondingly. Through the first signal changed, i.e., the changes of the distance and direction of the image taken by the optical element 1101, the electronic apparatus calculates the corresponding magnitude and direction of movement of the cursor on the display screen. In this way, the user can change the position of the cursor on the display screen through moving the mouse 100. To be more specific, taking as an example that the second direction D2 faces to the picture as projected from the electronic apparatus, the user is allowed to gesture with the mouse 100 in the air to directly control the position of the cursor on the picture as projected, which is largely convenient to the user.

On the other hand, in other words, no matter the mouse 100 abuts against the flat surface 200 or leaves from the flat surface 200, the user can control the position of the cursor corresponding to the display screen of the electronic apparatus, which is largely convenient and flexible to the user during operation.

Moreover, through the reduction in length upon compression or elastic recovery of the elastic element 1209, when the mouse 100 abuts against the flat surface 200 or leaves from the flat surface 200, the facing direction of the optical element 1101 can automatically switch between the first direction D1 and the second direction D2. The process is simple and fast.

In order for the electronic apparatus to calculate the magnitude and direction of the corresponding movement of the cursor on the display screen more accurately, in this embodiment, the casing 1200 further includes a sensor 1213. As shown in FIGS. 3, 4, and 7, the sensor 1213 is located inside the main body 1201. The sensor 1213 is configured to sense whether the optical element 1101 faces to the first direction D1 or the second direction D2 and provide a second data. In other words, the sensor 1213 can sense and thus judge whether the optical element 1101 faces to the first direction D1 or the second direction D2, and provide the second data according to the optical element 1101 facing to the first direction D1 or the second direction D2. The sensor 1213 is electrically connected to the signal transmitter 1211. The signal transmitter 1211 is configured to transmit a second signal to the electronic apparatus according to the second data.

When the mouse 100 abuts against the flat surface 200 and the optical element 1101 faces to the first direction D1, the image taken by the optical element 1101 is relatively close to the optical element 1101. Thus, the magnitude of movement obtained from the image is approximately equal to the actual magnitude of movement of the mouse 100. However, when the mouse 100 is picked up and is in the air, the image taken by the optical element 1101 is relatively far away from the optical element 1101 (when compared to the situation that the mouse 100 abuts against the flat surface 200). Thus, the magnitude of movement obtained from the image is much larger than the actual magnitude of movement of the mouse 100. Therefore, since the sensor 1213 can sense and thus judge whether the optical element 1101 faces to the first direction D1 or the second direction D2, the electronic apparatus can calculate the magnitude and direction of the corresponding movement of the cursor on the display screen more accurately with respect to magnitude of movement obtained from the image.

In conclusion, the aforementioned embodiments of the present disclosure have at least the following advantages:

(1) No matter the mouse abuts against the flat surface or leaves from the flat surface, the user can control the position of the cursor corresponding to the display screen of the electronic apparatus, which is largely convenient and flexible to the user during operation.

(2) The user is allowed to gesture with the mouse in the air to directly control the position of the cursor on the picture as projected, which is largely convenient to the user.

(3) Through the reduction in length upon compression or elastic recovery of the elastic element, when the mouse abuts against the flat surface or leaves from the flat surface, the facing direction of the optical element can automatically switch between the first direction and the second direction. The process is simple and fast.

(4) Since the sensor can sense and thus judge whether the optical element faces to the first direction or the second direction, the electronic apparatus can calculate the magnitude and direction of the corresponding movement of the cursor on the display screen more accurately with respect to magnitude of movement obtained from the image.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A mouse, comprising:
   an optical module, comprising:
      an optical element; and
      two rotation portions, the optical element being located between the rotation portions along an axis; and
   a casing, comprising:
      a main body;
      two extension portions respectively connected to the main body, the extension portions defining an accommodation space therebetween, the optical module being at least partially located in the accommodation space, the rotation portions respectively at least partially inserting into the extension portions;
      a driving piece configured to move inside the main body and the extension portions, the driving piece being mechanically connected with one of the rotation portions and being configured to rotate the corresponding rotation portion, such that the optical element faces to a first direction or a second direction different from the first direction; and
      a supporting rod configured to move relative to the main body along the first direction, the supporting rod having a first end and a second end opposite to each other, the first end being mechanically connecting with the driving piece and configured to move the driving piece, the second end being configured to be exposable outside the main body.

2. The mouse of claim 1, wherein the casing further comprises a connection portion connected between the first end and the driving piece.

3. The mouse of claim 1, wherein the casing has a base plate having a through hole, and the supporting rod at least partially penetrating through the through hole along the first direction.

4. The mouse of claim 3, wherein the driving piece is configured to move along a direction at least partially parallel with the base plate.

5. The mouse of claim 4, wherein the direction is same as the second direction.

6. The mouse of claim 3, wherein the casing has a top plate opposite to the base plate, and the driving piece is at least partially located and restricted between the top plate and the corresponding rotation portion.

7. The mouse of claim 3, wherein the main body further comprises a side plate connected with the base plate and adjacent to the accommodation space, and the casing further comprises an elastic element at least partially connected between the side plate and the driving piece.

8. The mouse of claim 7, wherein an elastic force of the elastic element is less than a weight of the mouse and larger than a weight of the optical module.

9. The mouse of claim 1, wherein at least one of the rotation portions has a plurality of first sawteeth, the first sawteeth are arranged around the axis, the driving piece has a plurality of second sawteeth, the second sawteeth are disposed on a side of the driving piece facing to the corresponding rotation portion and are configured to couple with the first sawteeth.

10. The mouse of claim 1, wherein the optical element is an optical motion tracking chip configured to calculate a moving distance according to an image.

11. The mouse of claim 10, wherein the casing further comprises:
   a processor disposed inside the main body and configured to convert the moving distance to a first data;
   a signal transmitter electrically connected with the processor and configured to transmit a first signal to an electronic apparatus according to the first data; and
   at least one connecting cable electrically connected to the processor and the optical element, the connecting cable at least partially penetrates through one of the rotation portions.

12. The mouse of claim 11, wherein the casing further comprises a sensor located inside the main body and configured to sense whether the optical element faces to the first direction or the second direction and provide a second data, the sensor is electrically connected to the signal transmitter, the signal transmitter is configured to transmit a second signal to the electronic apparatus according to the second data.

13. The mouse of claim 1, wherein the second direction is substantially perpendicular to the first direction.

* * * * *